United States Patent
Chen

(10) Patent No.: US 9,427,809 B2
(45) Date of Patent: Aug. 30, 2016

(54) BORING BAR FASTENING DEVICE FOR SINGLE OR DOUBLE BLADE

(71) Applicant: X'POLE PRECISION TOOLS INC., Taoyuan County (TW)

(72) Inventor: Peter Chen, Taoyuan County (TW)

(73) Assignee: X'POLE PRECISION TOOLS INC., Taoyuan County (TW)

( * ) Notice: Subject to any disclaimer, the term of this patent is extended or adjusted under 35 U.S.C. 154(b) by 103 days.

(21) Appl. No.: 14/522,816

(22) Filed: Oct. 24, 2014

(65) Prior Publication Data

US 2016/0114402 A1 Apr. 28, 2016

(51) Int. Cl.
*B23B 29/034* (2006.01)
*B23B 29/03* (2006.01)

(52) U.S. Cl.
CPC .............. *B23B 29/03* (2013.01); *B23B 29/034* (2013.01); *B23B 29/03403* (2013.01); *B23B 29/03407* (2013.01); *B23B 2220/445* (2013.01); *B23B 2229/08* (2013.01); *B23B 2229/12* (2013.01); *B23B 2250/04* (2013.01)

(58) Field of Classification Search
CPC .......... B23B 29/034; B23B 29/03403; B23B 29/03407; B23B 2229/08; B23B 2229/04; B23B 2250/04; Y10T 408/8598; Y10T 408/858
See application file for complete search history.

(56) References Cited

U.S. PATENT DOCUMENTS

| 1,324,459 | A | * | 12/1919 | Maier | B23B 29/0341 408/182 |
|---|---|---|---|---|---|
| 3,144,792 | A | * | 8/1964 | Marchis | B23B 29/03414 408/116 |
| 4,096,771 | A | * | 6/1978 | Monro | B23B 29/02 408/83 |
| 5,396,693 | A | * | 3/1995 | Lohner | B23B 29/0341 29/527.1 |
| 5,611,651 | A | * | 3/1997 | Wohlhaupter | B23B 29/03403 408/143 |
| 5,857,811 | A | * | 1/1999 | Kaiser | B23B 29/034 407/101 |
| 8,066,455 | B2 | * | 11/2011 | Neumann | B23B 31/008 403/361 |
| 8,770,899 | B2 | * | 7/2014 | Frank | B23B 29/03407 408/143 |
| 2006/0239787 | A1 | * | 10/2006 | Stadelmann | B23B 29/03407 408/124 |
| 2011/0008115 | A1 | * | 1/2011 | Chen | B23B 29/03403 407/46 |

FOREIGN PATENT DOCUMENTS

| EP | 0673710 A1 * | 9/1995 | ....... B23B 29/03403 |
| WO | WO 2011/051355 A1 * | 5/2011 | ....... B23B 29/03407 |

* cited by examiner

*Primary Examiner* — Sunil K Singh
*Assistant Examiner* — Ryan Rufo
(74) *Attorney, Agent, or Firm* — Chun-Ming Shih

(57) ABSTRACT

A boring bar fastening device for a single or double blade is provided with a body, a first fastening device releasably mounted to the body, a first boring bar fastening member releasably mounted on the first fastening device, a first blade releasably mounted on the first boring bar fastening member, a second fastening device releasably mounted to the body, and a second blade releasably mounted on the second boring bar fastening member. Alternatively, both the second boring bar fastening member and the second blade are replaced by a balance weight. Two configurations are provided for selection depending on applications.

8 Claims, 6 Drawing Sheets

BORING BAR FASTENING DEVICE FOR SINGLE OR DOUBLE BLADE

BACKGROUND OF THE INVENTION

1. Field of the Invention

The invention relates to boring bars and more particularly to a boring bar fastening device for a single blade configuration or a double blade configuration.

2. Description of Related Art

CNC (computer numerical control) lathes are widely employed as technologies advance. The CNC lathes can perform cutting, drilling, etc. on an object. For example, a lathe may be required to cut an object by using one of different blades.

Diameter of a bore formed by boring a workpiece done by a lathe is required to precisely controlled. Typically, a boring bar is used for a rough boring and a fine boring of the bore. In detail, initially a boring bar having a double blade is used for a rough boring of the bore and then a boring bar having a single blade is used for a fine boring of the bore. However, there is no boring bar fastening device for single or double blade commercially available as far as the present inventor is aware. Thus, a worker has to detach the cutter from the lathe and replace the blade with a suitable one in the machining process. This is a laborious, time consuming job. Further, the newly blade may be not securely and/ore precisely mounted. Thus, it may cause vibration and even damage during the machining process.

Thus, the need for improvement still exists.

SUMMARY OF THE INVENTION

It is therefore one object of the invention to provide a boring bar fastening device for a single blade or a double blade comprising a body configured to secure to a cutter and including a first through hole on a front end and a second through hole on a rear end; a first fastening device releasably mounted in the first through hole and including a fastening end extending out of one end of the first through hole; a first boring bar fastening member releasably mounted on the fastening end of the first fastening device; a first blade releasably mounted on the first boring bar fastening member; a second fastening device releasably mounted in the second through hole and including a fastening end extending out of one end of the second through hole and being opposite to the fastening end of the first fastening device; a second boring bar fastening member or a balance weight releasably mounted on the fastening end of the second fastening device; and a second blade releasably mounted on the second boring bar fastening member; wherein the balance weight includes a pushing member on one end, the pushing member being exposed; and wherein a distance between the pushing member and an axis of the body is equal to that between the first blade and the axis of the body.

Preferably, the body is substantially cylindrical.

Preferably, the first through hole is parallel to the second through hole.

Preferably, the balance weight is cylindrical.

Preferably, the second fastening device further includes an axial channel configured to receive the inserted balance weight.

Preferably, the pushing member has an arcuate surface.

It is envisaged by the invention that the boring bar fastening device for single or double blade is highly adapted. It allows the second boring bar fastening member to be mounted in the rear through hole and the other blade to be mounted to the second boring bar fastening member in a double blade in a first configuration (i.e., double blade) or allows the balance weight 60 to be mounted in the rear through hole 12 in a second configuration (i.e., single blade). As a result, vibration is reduced to a minimum, machining operation is more stable, yield is increased, and useful life of the cutter is prolonged.

BRIEF DESCRIPTION OF THE DRAWINGS

The invention, as well as its many advantages, may be further understood by the following detailed description and drawings in which.

DETAILED DESCRIPTION OF THE INVENTION

Figure 1:
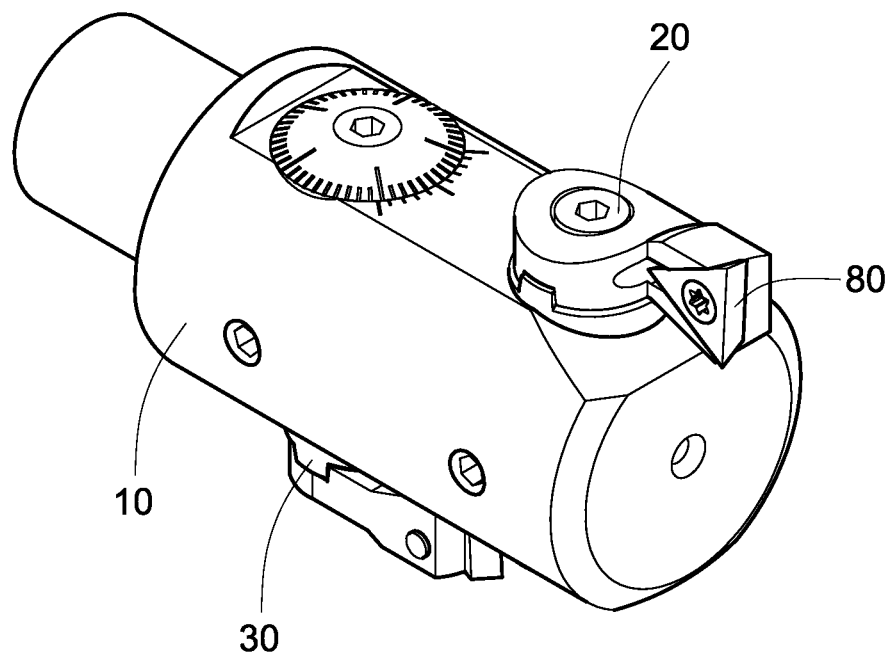
FIG. 1 is a perspective view of a boring bar fastening device for a double blade configuration according to a first preferred embodiment of the invention.
Figure 2:
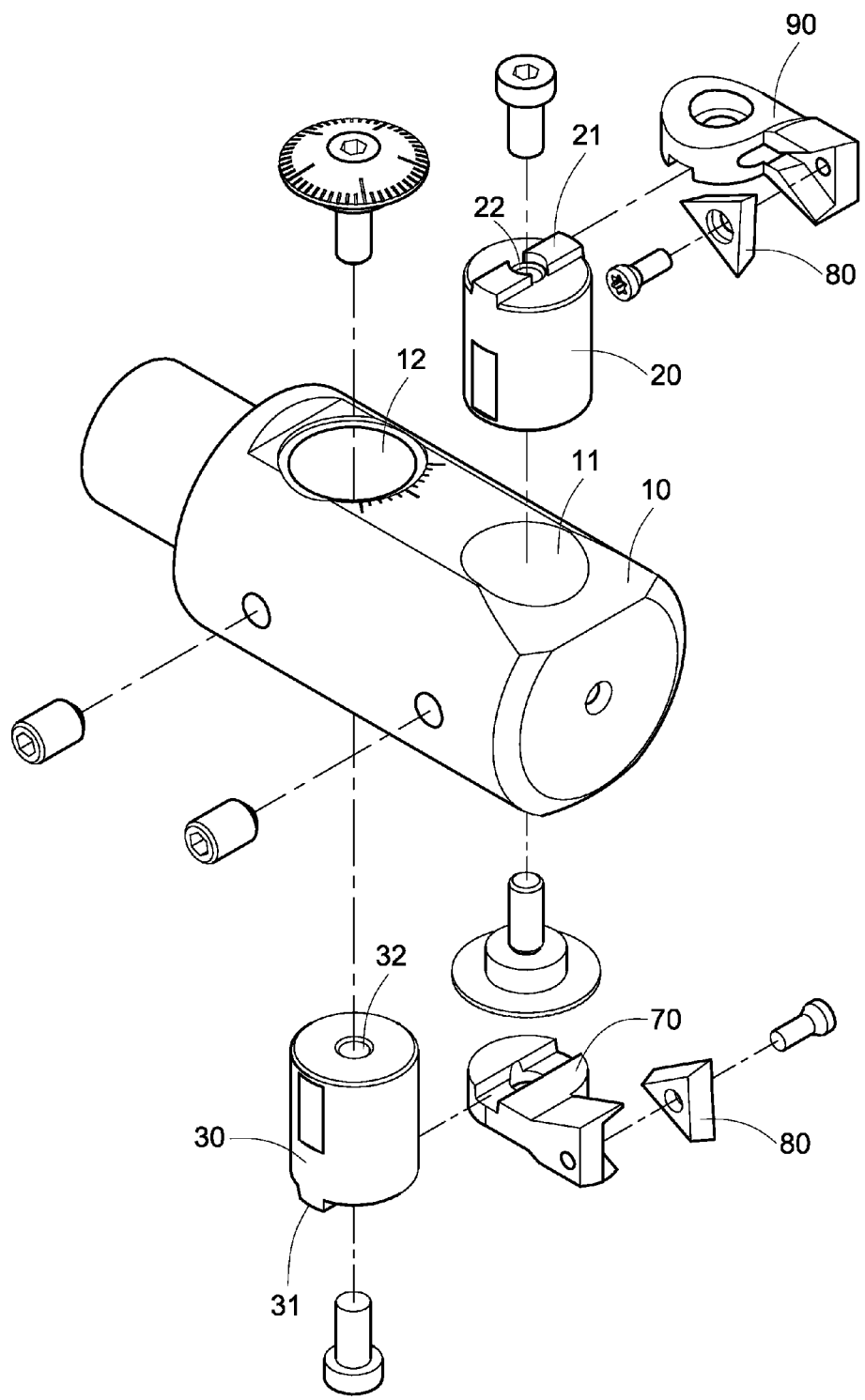
FIG. 2 is an exploded view of FIG. 1.
Figure 3:
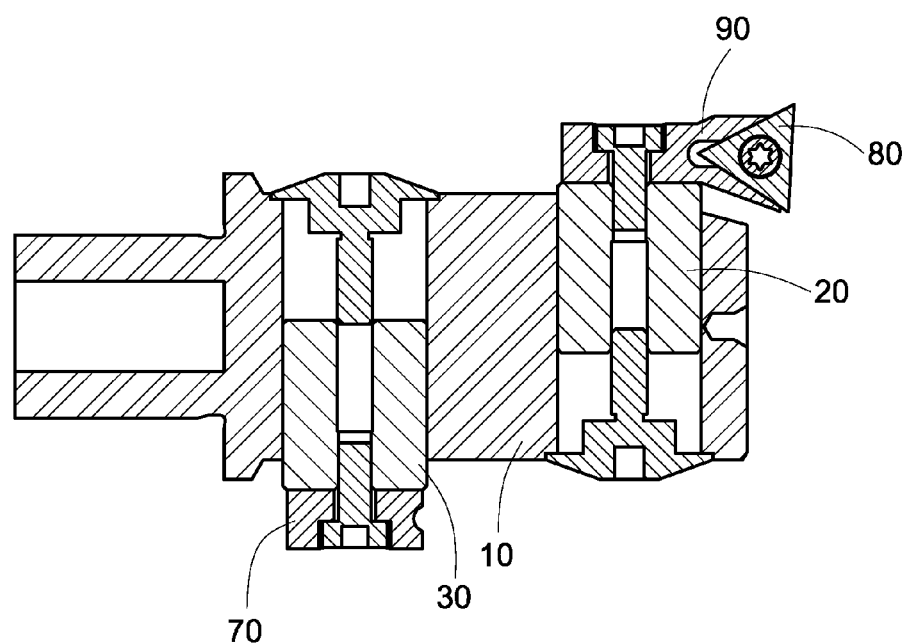
FIG. 3 is a longitudinal section view of FIG. 1.

Referring to FIGS. 1 to 3, a boring bar fastening device for a double blade configuration in accordance with a first preferred embodiment of the invention comprises a body 10, a first fastening device 20, and a second fastening device 30 as discussed in detail below.

The body 10 is configured to secure to a cutter and is substantially cylindrical. The body 10 includes a front through hole 11 and a rear through hole 12 parallel to the front through hole 11.

The first fastening device 20 is releasably mounted in the front through hole 11 and is substantially cylindrical. The first fastening device 20 includes two opposite risers 21 on one end, the risers 21 being slightly spaced from one mouth of the front through hole 11, and an axial channel 22. A first boring bar fastening member 90 is releasably mounted on the risers 21. One of two blades 80 is releasably mounted on the first boring bar fastening member 90.

The second fastening device 30 is releasably mounted in the rear through hole 12 and is substantially cylindrical. The second fastening device 30 includes two opposite risers 31 on one end, the risers 31 being slightly spaced from the other mouth of the rear through hole 12, and an axial channel 32. A second boring bar fastening member 70 is releasably mounted on the risers 31. The other blade 80 is releasably mounted on the second boring bar fastening member 70.

Figure 4:
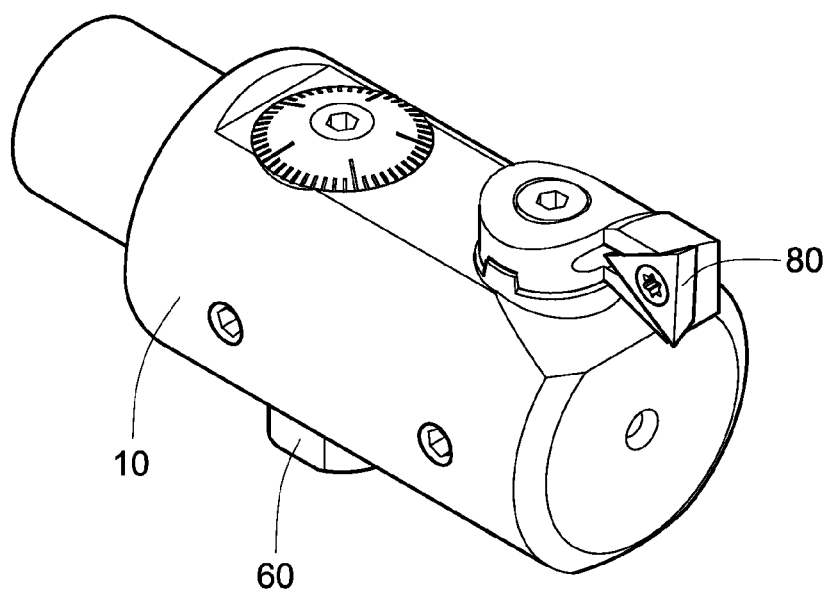
FIG. 4 is a perspective view of a boring bar fastening device for a single blade configuration according to a second preferred embodiment of the invention.
Figure 5:
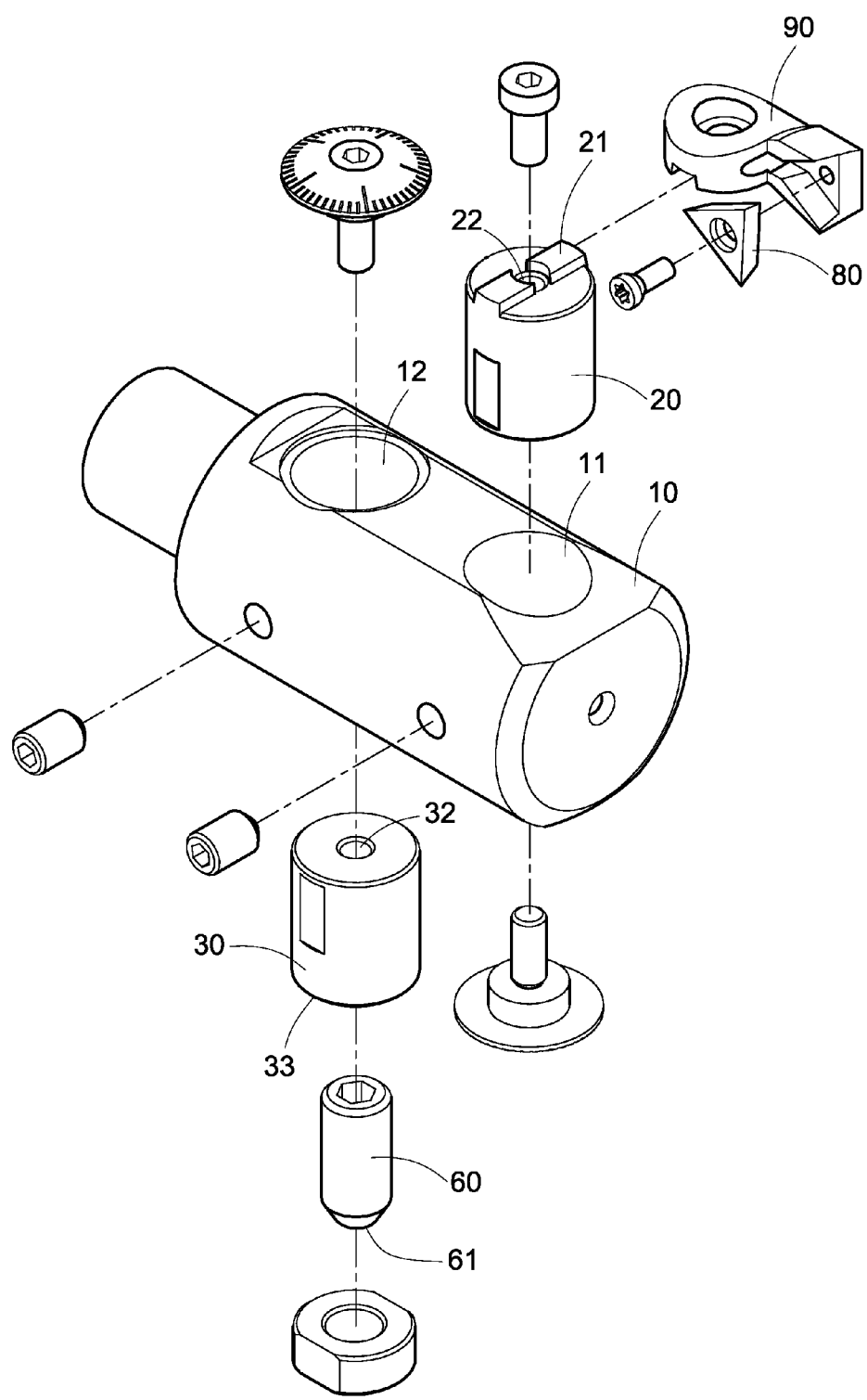
FIG. 5 is an exploded view of FIG. 4.
Figure 6:
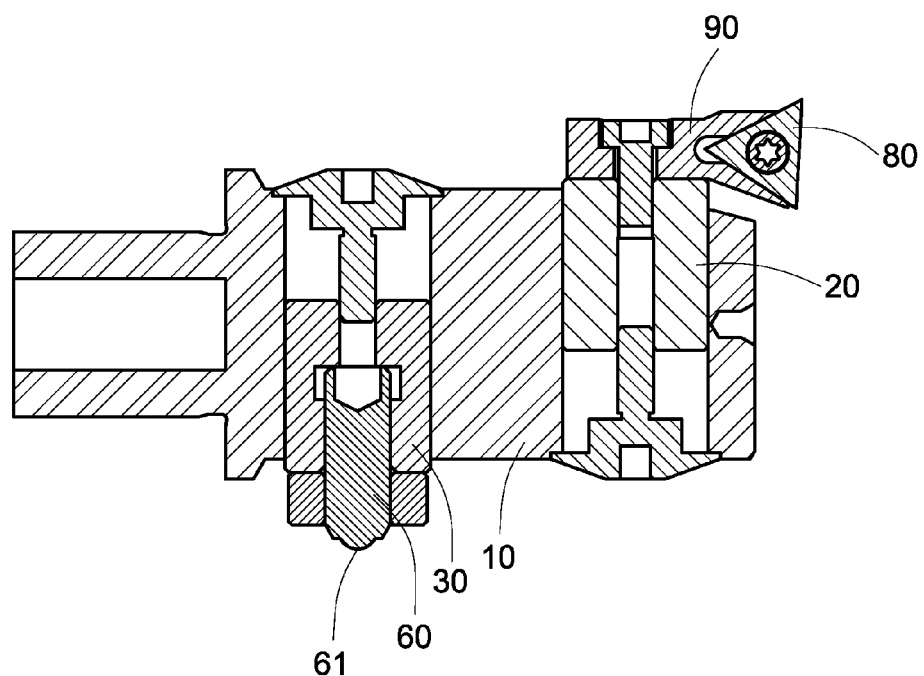
FIG. 6 is a longitudinal section view of FIG. 4.

Referring to FIGS. 4 to 6, a boring bar fastening device for a single blade configuration in accordance with a second preferred embodiment of the invention is shown. The characteristics of the second preferred embodiment are substantially the same as that of the first preferred embodiment except the following:

The second fastening device 30 is releasably mounted in the rear through hole 12 and is substantially cylindrical. The second fastening device 30 includes a fastening end 33 slightly spaced from the other mouth of the rear through hole 12, and an axial channel 32. The fastening end 33 is opposite to the risers 21 of the first fastening device 20. A balance weight 60 is secured to the second fastening device 30 and includes a pushing member 61 on one end, the pushing member 61 being exposed. A distance between the pushing member 61 and the axis of the body 10 is equal to that between the blade 80 and the axis of the body 10. The pushing member 61 is used to urge against a workpiece to be cut so that the machining process can be stably performed. Preferably, the pushing member 61 has an arcuate surface.

Preferably, the balance weight 60 is cylindrical and the channel 32 is configured to receive the inserted balance weight 60.

It is envisaged by the invention that the boring bar fastening device for single or double blade is highly adapted. It allows the second boring bar fastening member 70 to be mounted in the rear through hole 12 and the other blade 80 to be mounted to the second boring bar fastening member 70 in a double blade in a first configuration (i.e., double blade) or allows the balance weight 60 to be mounted in the rear through hole 12 in a second configuration (i.e., single blade). As a result, vibration is reduced to a minimum, machining operation is more stable, yield is increased, and useful life of the cutter is prolonged.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A boring bar fastening device for a single blade or a double blade comprising:
    a body configured to secure to a cutter and including a first through hole on a front end and a second through hole on a rear end;
    a first fastening device releasably mounted in the first through hole and including a first fastening end extending out of one end of the first through hole;
    a first boring bar fastening member releasably mounted on the first fastening end of the first fastening device;
    a first blade releasably mounted on the first boring bar fastening member;
    a second fastening device releasably mounted in the second through hole and including a second fastening end extending out of one end of the second through hole and being opposite to the first fastening end of the first fastening device; and
    a balance weight releasably mounted on the second fastening end of the second fastening device;
    wherein the balance weight includes a pushing member on one end, the pushing member is exposed; and
    wherein a distance between the pushing member and an axis of the body is equal to that between the first blade and the axis of the body.

2. The boring bar fastening device for a single blade or a double blade of claim 1, wherein the body is substantially cylindrical.

3. The boring bar fastening device for a single blade or a double blade of claim 1, wherein the first through hole is parallel to the second through hole.

4. The boring bar fastening device for a single blade or a double blade of claim 1, wherein the balance weight is cylindrical.

5. The boring bar fastening device for a single blade or a double blade of claim 4, wherein the second fastening device further includes an axial channel configured to receive the inserted balance weight.

6. The boring bar fastening device for a single blade or a double blade of claim 4, wherein the pushing member has an arcuate surface.

7. The boring bar fastening device for a single blade or a double blade of claim 1, wherein the first fastening device has two opposing risers being protruded from the first fastening end thereof, and an engaging slot is formed on a bottom surface of the first boring bar fastening member, the first boring bar fastening member is detachably fixed to the first fastening device by inserting the two opposing risers into the engaging slot.

8. The boring bar fastening device for a single blade or a double blade of claim 1, wherein the balance weight is replaceable with a second boring bar fastening member.

\* \* \* \* \*